US007826194B2

(12) United States Patent
Brand

(10) Patent No.: US 7,826,194 B2
(45) Date of Patent: Nov. 2, 2010

(54) TUNABLE LAMBDA/4 FILTER SUBASSEMBLY

(75) Inventor: Friedrich-Eckhard Brand, Barntrup (DE)

(73) Assignee: Phoenix Contact GmbH & Co. KG (DE)

( * ) Notice: Subject to any disclaimer, the term of this patent is extended or adjusted under 35 U.S.C. 154(b) by 218 days.

(21) Appl. No.: 12/146,028

(22) Filed: Jun. 25, 2008

(65) Prior Publication Data

US 2009/0002103 A1 Jan. 1, 2009

(30) Foreign Application Priority Data

Jun. 27, 2007 (DE) ....................... 10 2007 030 157

(51) Int. Cl.
*H01P 1/22* (2006.01)
*H01C 7/12* (2006.01)
*H02H 1/00* (2006.01)

(52) U.S. Cl. .......................... 361/119; 361/56; 333/202

(58) Field of Classification Search ................. 333/202, 333/206, 207; 361/56, 119
See application file for complete search history.

(56) References Cited

U.S. PATENT DOCUMENTS 2,438,912 A 4/1948 Hansen et al.
3,264,584 A 8/1966 Edwards
4,544,984 A 10/1985 Kawanami et al.
5,982,602 A * 11/1999 Tellas et al. ................. 361/119
7,092,230 B2 * 8/2006 Inauen ....................... 361/119
7,324,318 B2 * 1/2008 Harwath et al. ............. 361/119
7,440,253 B2 * 10/2008 Kauffman ................... 361/119

FOREIGN PATENT DOCUMENTS

DE 1541960 11/1970
DE 87 341 1/1972
DE 195 20 974 A1 12/1996
DE 19520974 A1 * 12/1996
DE 9422171 UI 10/1998
EP 1 075 053 A2 2/2001
EP 1 772 931 A2 4/2007
EP 1772931 A2 4/2007
WO 2004004064 A1 1/2004
WO WO2004004064 A * 1/2004

OTHER PUBLICATIONS

"EP Patent Application No. EP 08 01 0853 Search Report", Oct. 17, 2008, Publisher: EPO, Published in: EP.

* cited by examiner

*Primary Examiner*—Dean O Takaoka
(74) *Attorney, Agent, or Firm*—DeMont & Breyer LLC

(57) ABSTRACT

The invention relates to a tunable λ/4-filter subassembly whose frequency response can be adjusted. For this purpose, the λ/4-filter subassembly has a signal-conducting electrical conductor and an electrically conductive element that is at a reference potential. Furthermore, at least one short-circuit device is provided that electrically contacts the electrical conductor. An electrical coupling device is provided that couples the short-circuit device at a settable contact position to the electrically conductive element, wherein the electrical coupling device and the short-circuit device are movable relative to each other in order to set the length of the short-circuit device.

16 Claims, 3 Drawing Sheets

100

TUNABLE LAMBDA/4 FILTER SUBASSEMBLY

FIELD OF THE INVENTION

The invention relates to a tunable λ/4 filter subassembly with a signal conducting electrical conductor and an electrically conductive element which is at a reference potential and that may be in particular, a housing connected to ground.

BACKGROUND OF THE INVENTION

λ/4-filters are used, for example, in high frequency technology as bandpass filters. Such filters have, for example, a short-circuit line of fixed length between a signal-conducting conductor and a ground. The bandwidth of the filter depends on the length of the short-circuit conductor, which determines the center frequency of the filter according to the equation $f_0=c/\lambda$. The bandpass character of such a filter is obtained from the special wave characteristic at high frequencies, since, at high frequencies, the short-circuit at the center frequency $f_0$ is blocked, so that signals with frequencies that are distributed over a certain bandwidth about the center frequency can pass through the conductor.

Such filters are also used for surge protection, for example, in mobile telephony.

Thus, for example in DE 9422 171 U1 describes a surge voltage protection plug connector for a coaxial cable having an inner and an outer conductor, where a spiral-shaped short-circuiting stub of fixed length short circuits the inner conductor with the outer conductor.

From U.S. Pat. No. 6,061,223, for example, a surge voltage protection device is known, in which an inner conductor is arranged in a housing, which together form a coaxial line. A spiral-shaped conductor of fixed length is used as a short-circuit element to transfer the energy during a surge voltage event to a ground connection.

One drawback of the mentioned filter is that, due to the fixed short-circuit length, the center frequency is determined in a fixed way. A different filter therefore must be used for each different frequency behavior.

SUMMARY OF THE INVENTION

The present invention is therefore based on the problem of providing a λ/4-filter subassembly, which is universally usable for a variable frequency range.

The main idea of the invention is to provide a tunable λ/4-filter, whose frequency response is modifiable by setting the length of a short-circuit device.

The technical problem is solved by a tunable λ/4-filter component, which presents a signal conducting electrical conductor and an electrically conductive element at a reference potential. In addition, at least one short-circuit device is provided that establishes electrical contact with the electrical conductor. Furthermore, an electrical coupling device is provided, that couples the short-circuit device at a settable contact position to the electrically conductive element, where the electrical coupling device and the short-circuit device are relatively movable in order thereby to set the length of the short-circuit device.

The length of the short-circuit device is preferably continuously adjustable over a predeterminable length range, so that the center frequency of the tunable λ/4-filter subassembly also continuously adjustable. In this way, a λ/4-filter with variable bandpass behavior can be realized.

A short-circuit device advantageously has a first contact section, which is connected to the electrical conductor, as well as a second contact section that is connected to the first contact section and with which the electrical coupling device engages electrically.

A compact construction with a wide setting range is obtained if the second section of the short-circuit device forms an essentially circular conductor element, which is arranged essentially concentrically to and at a distance r from the electrical conductor, and whose circumference is less than 2πr.

The electrical element is preferably an electrically conductive housing, which at least partially surrounds the conductor and the at least one short-circuit device. The housing is preferably cylindrical in design.

To be able to set the length of the short-circuit device, the coupling installation presents a first rotatable, electrically-conducting setting element with a contact element. The contact element engages at a settable contact position on the short-circuit device. For this purpose, a slot of predetermined length is provided in the housing, which allows the contact element to be shifted with the aid of the setting element along the short-circuit device. The setting element is applied against the housing and is thus at the potential of the housing.

To be able to increase the bandwidth of the λ/4-filter subassembly, at least one additional short-circuit device is provided, which is axially offset with respect to the longitudinal axis of the electrical conductor opposite the first short-circuit device. It presents a first contact section, which is connected to the electrical conductor, as well as a second contact section that is connected to the first contact section and with which the coupling device engages electrically. In this way, the λ/4-filter subassembly has two center frequencies, which increase its bandwidth.

To obtain a compact construction, the second contact section of the additional short-circuit device as well forms a circular conductor element, which is arranged essentially concentrically to and at a distance r from the electrical conductor, and whose circumference is again less than 2πr. The electrical element is again designed as a conductive housing that at least partially surrounds the conductor and the short-circuit devices.

In this case, the coupling device presents a second rotatable electrically-conductive setting element with a contact element. The contact element engages at a settable contact position on the second short-circuit device, where, in the housing, a slot is provided to shift the contact element. The setting element is again located outside of the housing, so that the setting element and the housing are at the same potential. If the housing has a circular cross section, the setting elements are annular in design.

According to an embodiment, the two setting elements can be connected to each other. However, to be able to adjust the length of the two short-circuit devices individually, the two setting elements are movable independently of each other.

To be able to change the bandwidth of the λ/4-filter, an additional short-circuit device located in the same plane as the first short-circuit device is provided according to an alternative embodiment. The additional short-circuit device presents a first contact section, which is connected to the electrical conductor, and a second contact section that is connected to the first contact section and that the electrical coupling device engages electrically. The second contact sections of the two short-circuit devices form in each case a conductor element in the shape of a segment of a circle, which in each case is arranged essentially at a distance r about the electrical conductor, where both second contact sections are arranged essentially diametrically opposite to each other.

The circumference of each second contact section is less than $\pi r$.

In this embodiment example, the electrical element can again be a conductive housing, which at least partially surrounds the conductor and the short-circuit device.

In the mentioned example, the coupling device can present a rotatable electrically conducting setting element with two contact elements, where one contact element engages at a settable contact position on the second contact section of the first short-circuit device, and the other contact element engages at a settable contact position on the second contact section of the other short-circuit device. A slot is advantageously provided in the housing for shifting the contact elements with the aid of the setting element, where the setting element is in electrical contact with the housing and thus at the housing potential.

A more flexible and better performing coupling device presents a first and a second rotatable electrically conductive setting element, each with a contact element, where the setting elements are movable independently of each other. The contact element of the first setting element engages at a settable contact position on the second contact section of the first short-circuit device, while the contact element of the second setting element engages at a settable contact position on the second contact section of the other short-circuit device. Again, at least one slot can be provided in the housing to move the contact elements by means of the setting element, where the setting elements are applied against the housing, so that the setting elements and the housing are at the same potential.

In a preferred embodiment, the contact elements are designed as sliding contacts.

Instead of using a movable design for the coupling device, and connecting the short-circuit device firmly to the conductor, it is conceivable to use a stationary design of the coupling device, and to attach the at least one short-circuit device in a movable way. In a possible embodiment variant, the short-circuit devices can be connected in a freely movable way to the electrical conductor, where an electrical connection must be guaranteed. Furthermore, the short-circuit device may be connected to a dielectric setting element, which is applied in a movable way to the housing.

In an additional embodiment, it is conceivable not to design the coupling device so that it is rotatable about the conductor. Instead, the coupling device could be designed so that it is movable axially with respect to the conductor, where, in this case, the at least one short-circuit device runs at least sectionwise parallel to the conductor, and the coupling device engages with the short-circuit device.

BRIEF DESCRIPTION OF THE DRAWINGS

The invention will be explained in greater detail below with reference to two embodiment examples in connection with the drawings in the appendix.

In the drawings.

DETAILED DESCRIPTION

Figure 1:
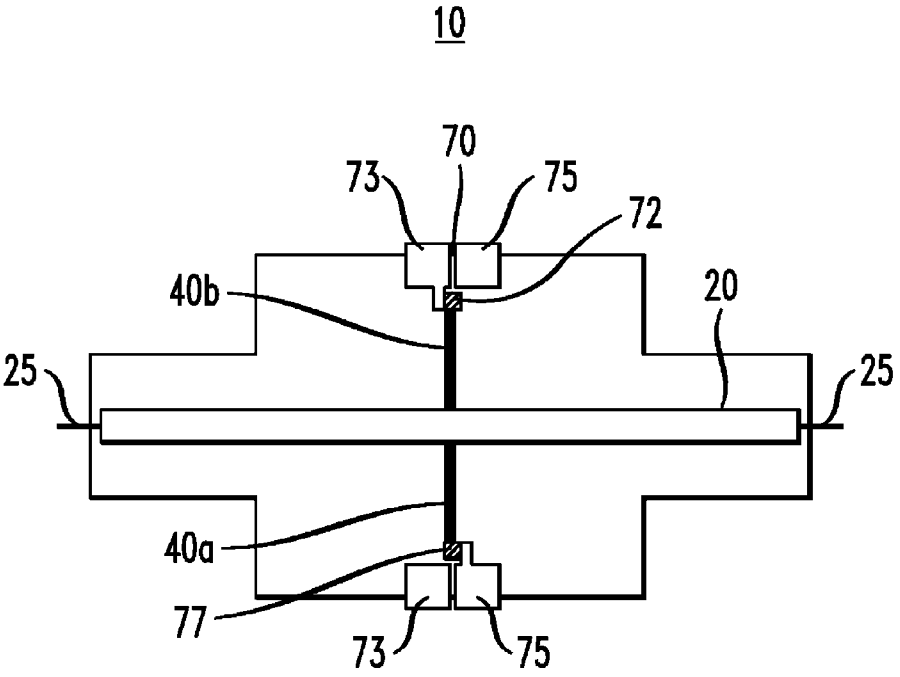
FIG. 1 shows a tunable λ/4-filter subassembly according to the invention in longitudinal cross section.

FIG. 1 shows, as an example, a λ/4-filter component 10, whose center frequency and thus whose bandwidth is settable with the aid of two short-circuit devices 40 and 50 of variable length. The λ/4-filter subassembly 10, which is represented schematically in longitudinal cross section, presents an inner signal-conducting conductor 20, which has connections 25 at both of its ends. The electrical conductor 20 is held preferably in a central position in an electrically conductive housing 30. In this example, the housing 30 has a circular cross section, where the diameter in the vicinity of the two line ends is less than in the middle area of the electrical conductor 20. The two short-circuit devices 40 and 50, for example, are soldered to the electrical conductor 20, whose design is represented in greater detail in FIG. 2. In order to vary the center frequency, a coupling device 70 is provided that has two electrically conductive rings 73 and 75 as setting elements. The electrical housing can have two parallel grooves in which the rings are guided in a rotatable way. A sliding contact 72 is shaped on the ring 73, which is in electrical contact with the short-circuit device 40, while on the ring 75, a sliding contact 77 is formed that is in electrical connection with the short-circuit device 50. Slots are provided in the housing 30, so that the sliding contacts can be moved along the given short-circuit device by means of the rings.

Figure 2:
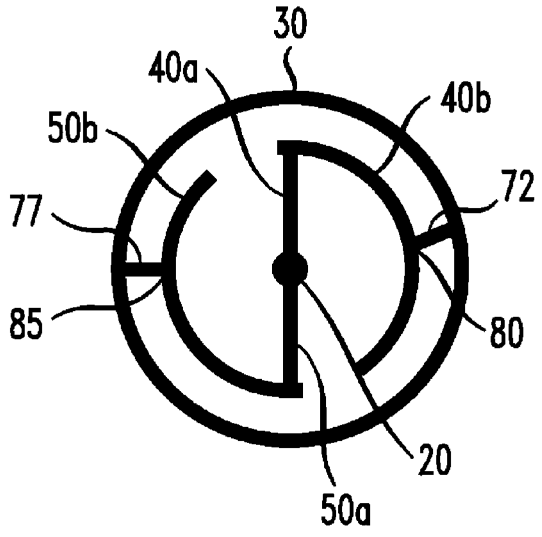
FIG. 2 shows a cross section of the λ/4-filter subassembly represented in FIG. 1.

FIG. 2 shows a cross section of the filter subassembly 10 and particularly of electrically conductive housing 30, which at least partially surrounds the electrical conductor 20 and the two short-circuit devices 40 and 50. The short-circuit device 40 has a first wire-like contact section 40*a*, whose end is electrically connected at a predetermined location to the electrical conductor 20. The wire-like contact section 40*a* extends perpendicularly away from the electrical conductor 20 a contact section 40*b* in the shape of a segment of a circle is formed and has a length r. on the outside end of the contact section 40*a*. The electrical conductor 20 forms the mid-point of the contact section 40*b* in the shape of a segment of a circle, where the radius of curvature of the contact section 40*b* essentially corresponds to the length r. The sliding contact 72 of the annular setting element 73 engages at a contact position 80 on the contact section 40*b* in the shape of a segment of a circle. In the case of one rotation of the annular setting element 73, the sliding contact 72 moves along the contact section 40*b* in the shape of a segment of a circle, which results in the possibility of continuously changing the contact position 80 and thus the length of the short-circuit device 40. The short-circuit connection extends from the conductor 20, via the contact sections 40*a* and 40*b*, the contact position 80, the sliding contact 72, and the setting element 73, to the electrically conductive housing 30.

The second short-circuit device 50 represented in FIG. 2 has a structure similar to the short-circuit device 40. A wire-like contact section 50*a* is electrically connected to the electrical conductor 20 at a location, so that both short-circuit devices 40 and 50 lie in the same plane. The wire-like contact section 50*a* again extends perpendicularly away from the electrical conductor 20. A contact section 50*b* in the shape of a segment of a circle is formed on its outside end. The wire-like contact section 50*a* may, if necessary, have the same length r as the wire-like contact section 40*a*. As shown in FIG. 2, both contact sections 40*b* and 50*b* in the shape of a segment of a circle have a circumference which is less [than] $\pi r$. In this way, a setting angle of less than 180° is obtained for the setting elements 73 and 75. In the examples shown, the setting angle can be, for example, 150°.

The sliding contact 77 of the setting element 75 engages at variable changeable contact position 85 on the contact section 50*b* in the shape of a segment of a circle, so that the length of the short-circuit device 50 can be set.

It should be noted here that the contact sections 40*b* and 50*b* in the shape of a segment of a circle, represented in FIG. 2, may also be designed as linear contact sections that are arranged parallel to the conductor 20. In this case, the setting elements 73 and 75 are not designed as rotatable rings, but as setting elements that can be shifted along the electrical conductor, where in this case, the sliding contacts 72 and 75 engage at the longitudinally shaped contact sections, that run parallel to the electrical conductor.

Figure 3:
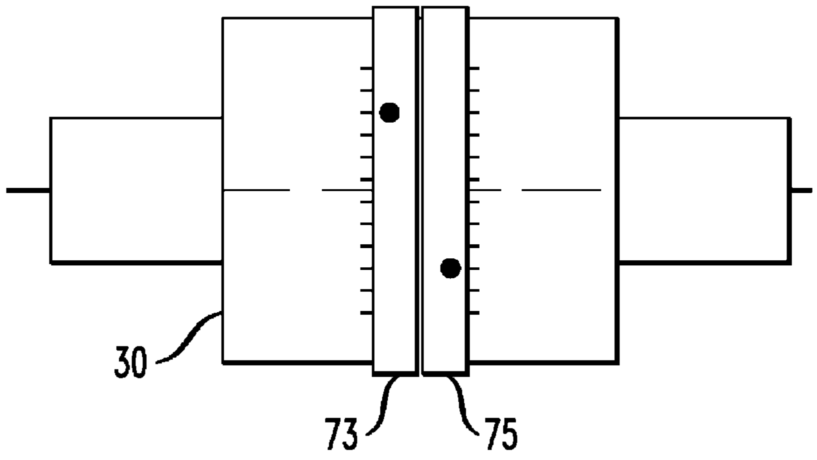
FIG. 3 shows a side view of the λ/4-filter subassembly shown in FIG. 1.

FIG. 3 shows a top view of the filter subassembly 10 shown in FIG. 1, with the two annular setting elements 73 and 75, where markings or locating points can be provided on the housing 30 to allow the setting of predefined bandwidths for the λ/4-filter subassembly 10.

Figure 4:
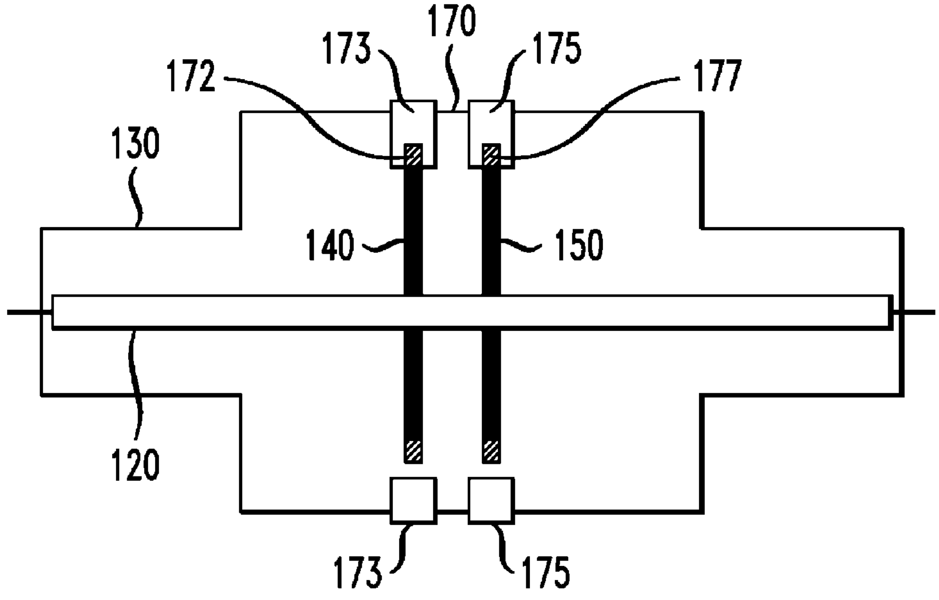
FIG. 4 shows an alternative embodiment of a tunable λ/4-filter subassembly according to the invention.

FIG. 4 shows an alternative λ/4-filter subassembly 100, in which two short-circuit devices 140 and 150 are arranged with axial offset with respect to an electrical conductor 120, and thus form a parallel circuit. An electrical housing 130 is at least partially arranged about the electrical conductor 120 and the short-circuit devices 140 and 150, and has a shape similar to that of the electrical housing 30 according to FIG. 1. A coupling device 170 is provided, which, with respect to the conductor 120, comprises two mutually axially offset annular setting elements 173 and 125. The annular setting element 173 has a sliding contact 172, which engages with the short-circuit device 140 to change its length, while a sliding contact 177 of the annular setting element 175 engages with the short-circuit device 150.

Figure 5:
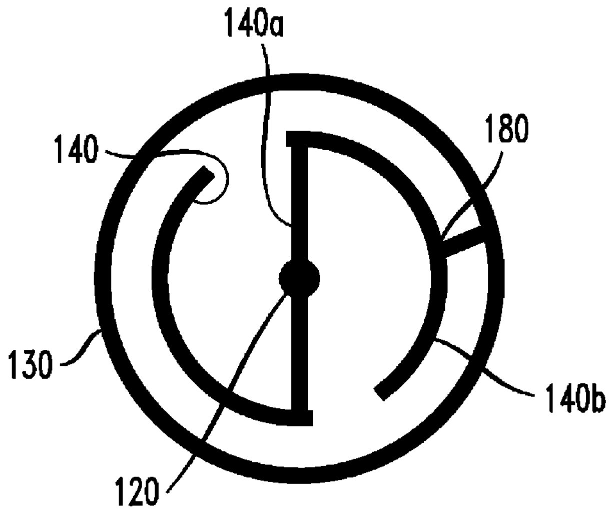
FIG. 5 shows a cross section of the λ/4-filter subassembly shown in FIG. 4.

FIG. 5 is a schematic representation of the cross section of the filter subassembly 100 shown in FIG. 4. The electrical housing 130 with circular cross section surrounds the electrical conductor 120 as well as the short-circuit devices 140 and 150, which is electrically connected to the conductor 130. In FIG. 5, only the short-circuit device 140 is shown. The short-circuit device 150 has a shape similar to that of the short-circuit device 140 and is covered by the latter in the representation shown. The short-circuit device 140 has a wire-like contact section 140*a,* which is soldered, for example, at the contact position of the electrical conductor 120. The wire-like contact section 140*a* extends perpendicularly away from the electrical conductor 120. The length of the section 140*a* is r. A circular contact section 140*b* is connected to the outside end of the wire-like contact section 140*a* and runs essentially concentrically to and at a distance r from the electrical conductor 120. The circumference of the circular contact section 140*b* is less than 2πr, so that the resulting setting angle for the setting element 173 is less than 360° but greater than the setting angle of the setting elements shown in FIGS. 1 and 2.

As shown in FIG. 5, the sliding contact 172 of the setting element 173 engages at a contact position 180 on the circular contact section 140*b,* resulting in the formation of an electrical connection between the electrical conductor 120 and the housing 130, which is formed via the contact section 140*a,* the circular contact section 140*b,* the sliding contact 172 of the electrically conducting setting element 173, and the housing 130. At an axial separation with respect to the latter, the setting element 175 and the short-circuit device 150 are arranged. The setting element 173 and the setting element 175 can be moved independently of each other, so that the bandwidth of the λ/4-filter subassembly 10 can be varied and set.

Figure 6:
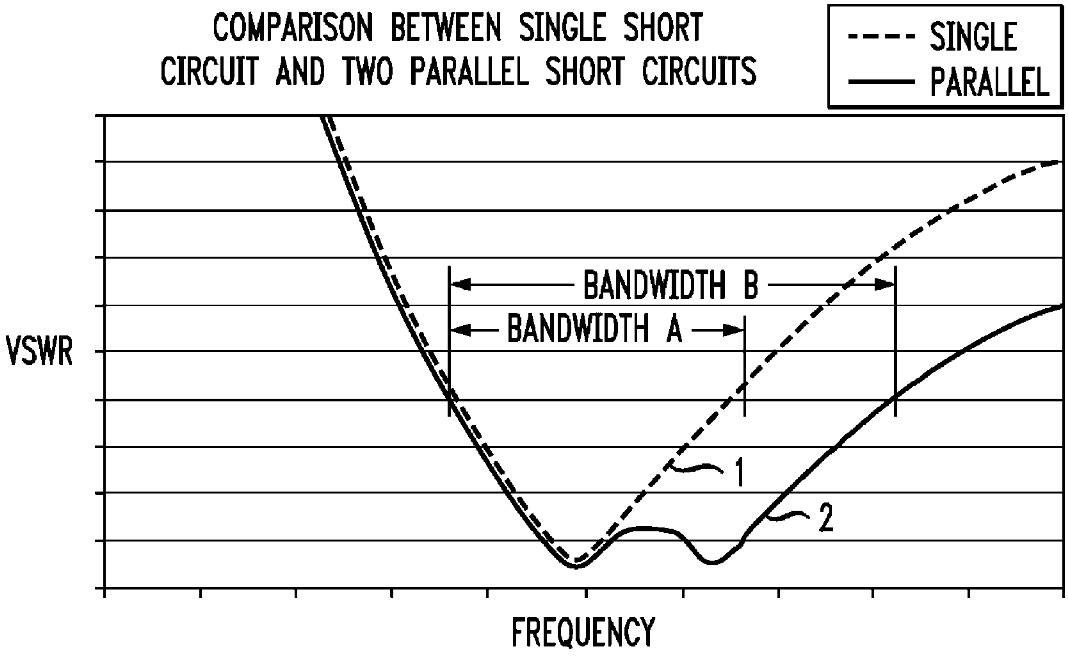
FIG. 6 shows the curve plots for the VSWR for a filter subassembly with one short-circuit device and with two short-circuit devices, respectively.

FIG. 6 shows the curve plots of the VSWR (Voltage Standing Wave Ratio) vs frequency for a λ/4-filter with a single short-circuit device and for the λ/4-filter subassembly shown in FIG. 4 with a parallel circuit of two short-circuit devices. It is evident that the bandwidth of a λ/4-filter subassembly, as shown in FIG. 4, presents a greater bandwidth than a λ/4-filter subassembly that uses only a single short-circuit device. The reason for this is that the two short-circuit devices 140 and 150 in each case establish a center frequency for the λ/4-filter, as can be seen in FIG. 6 at the locations labeled 1 and 2.

What is claimed is:

1. A tunable λ/4-filter subassembly comprising:

a electrical conductor that is signal-conducting;

an electrically conductive element that is at a reference potential and having a side that faces the electrical conductor;

a first short-circuit device that is in electrical contact with the electrical conductor; and an electrical coupling device that couples the first short-circuit device at a first settable contact position to the electrically conductive element, wherein the electrical coupling device and the first short-circuit device are movable relative to each other, so that the length of the first short-circuit device can be set, and wherein the first short-circuit device is situated entirely on the side of the electrically conductive element that faces the electrical conductor.

2. The tunable λ/4-filter subassembly according to claim 1, wherein the first short-circuit device has a first contact section that is connected to the electrical conductor, and a second contact section that is connected to the first contact section and that the electrical coupling device engages electrically.

3. The tunable λ/4-filter subassembly according to claim 2, wherein the second contact section forms a substantially circular conductor element that is arranged concentrically to and at a distance r from the electrical conductor and whose circumference is less than 2πr.

4. The tunable λ/4-filter subassembly according to claim 1, wherein the electrically conductive element is a housing that at least partially surrounds the electrical conductor and the first short-circuit device.

5. The tunable λ/4-filter subassembly according to claim 4, wherein the electrical coupling device has a first setting element that is rotatable and electrically conductive, the first setting element having a contact element that engages at the first settable contact position on the first short-circuit device, wherein a slot is provided in the housing to allow the passage of the contact element, and the first setting element is applied against the housing.

6. The tunable λ/4-filter subassembly according to claim 1, further comprising a second short-circuit device that is axially offset opposite the first short-circuit device, the second short-circuit device having a first contact section that is connected to the electrical conductor, and a second contact section that is connected to the first contact section and that the electrical coupling device engages electrically.

7. The tunable λ/4-filter subassembly according to claim 6, wherein the second contact section of the second short-circuit device forms a substantially circular conductor element that is arranged concentrically to and at a distance r from the electrical conductor and whose circumference is less than 2πr, in that the electrically conductive element is a housing that at least partially surrounds the electrical conductor and the first and second short-circuit devices, in that the electrical coupling device presents a first setting element and a second setting element that are rotatable and electrically conductive, the second setting element having a contact element that engages at a second settable contact position with the second short-circuit device, wherein a slot is provided in the housing to allow the passage of the contact element, and the second setting element is applied against the housing.

8. The tunable λ/4-filter subassembly according to claim 7, wherein the first and second setting elements are connected to each other or are movable independently of each other.

9. The tunable λ-4-filter subassembly according to claim 2, further comprising a second short-circuit device that presents a third contact section that is connected to the electrical conductor, and a fourth contact section that is connected to the third contact section and that the electrical coupling device engages electrically, wherein the first and second short-circuit devices lie in the same plane.

10. The tunable λ/4-filter subassembly according to claim 9, wherein the second and fourth contact sections each form a conductor element in the shape of a segment of a circle, which in each case is arranged at a distance r about the electrical conductor, and in that the second and fourth contact sections are arranged substantially diametrically opposite to each other.

11. The tunable λ/4-filter subassembly according to claim 10, wherein the circumference of the second and fourth contact section is less than πr.

12. The tunable λ/4-filter subassembly according to claim 10, wherein the electrically conductive element is a housing that at least partially surrounds the electrical conductor and the first and second short-circuit devices, in that the electrical coupling device presents a setting element that is rotatable and electrically conductive, the setting element having two contact elements, wherein one contact element engages at the first settable contact position on the second contact section, and the other contact element engages at a second settable contact position on the fourth contact section, and wherein a slot is provided in the housing to allow the passage of the two contact elements, and the setting element is applied against the housing.

13. The tunable λ/4-filter subassembly according to claim 10, wherein the electrically conductive element is a housing that at least partially surrounds the electrical conductor and the first and second short-circuit devices, in that the electrical coupling device presents a first and a second setting element, each of which being rotatable and electrically conductive and having a contact element, wherein the contact element of the first setting element engages at the first settable contact position on the second contact section, and the contact element of the second setting element engages at a second settable contact position on the fourth contact section, and wherein at least one slot is provided in the housing to allow the passage of the contact elements of the first and second setting elements, and the first and second setting elements are applied against the housing.

14. The tunable λ/4-filter subassembly according to claim 5, wherein the contact element is a sliding contact.

15. The tunable λ/4-filter subassembly according to claim 1, wherein the first short-circuit device is attached to the electrical conductor in a movable way.

16. The tunable λ/4-filter subassembly according to claim 1, wherein the electrical coupling device is movable axially with respect to the electrical conductor, where the first short-circuit device runs parallel at least section-wise to the electrical conductor.

* * * * *